UNITED STATES PATENT OFFICE.

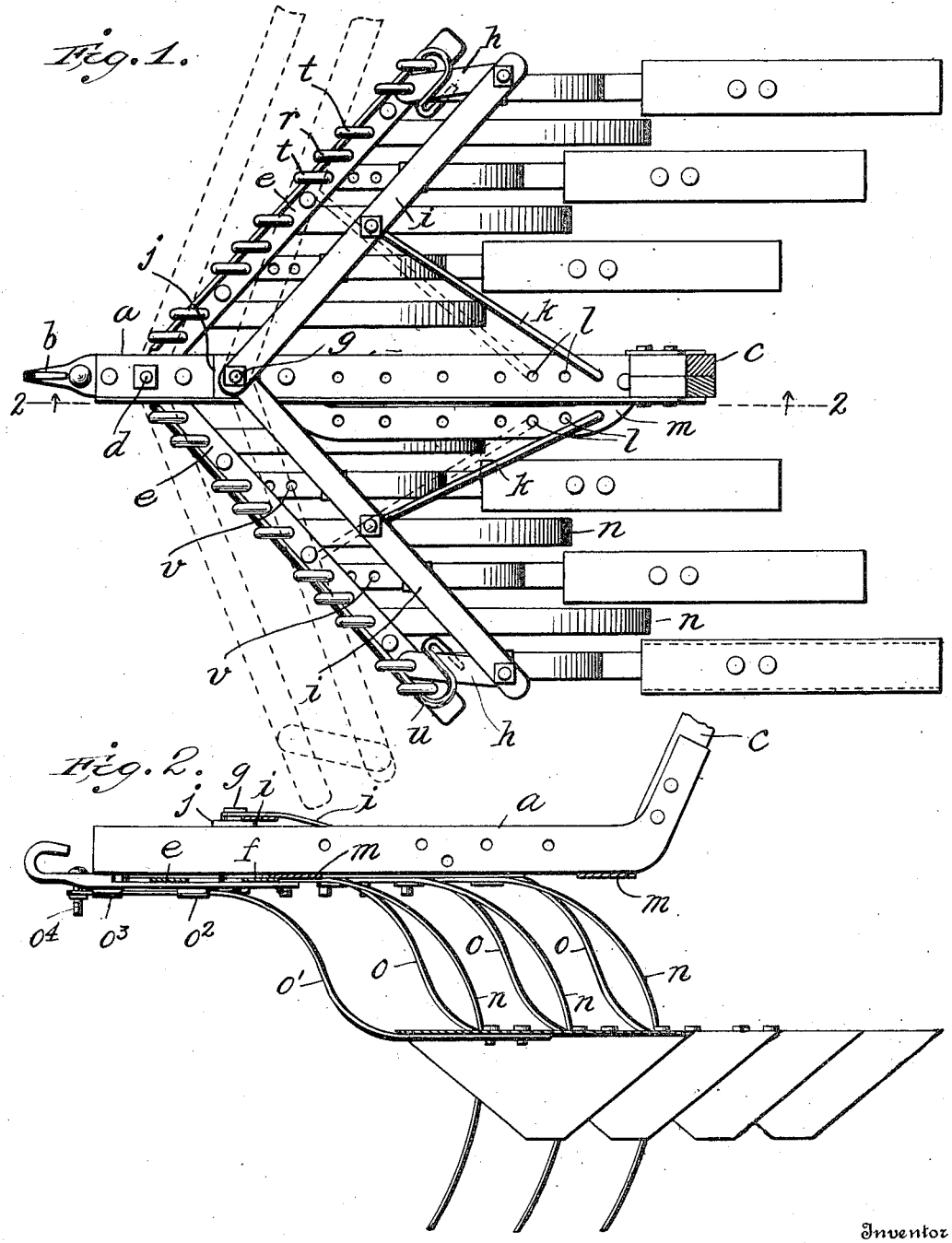

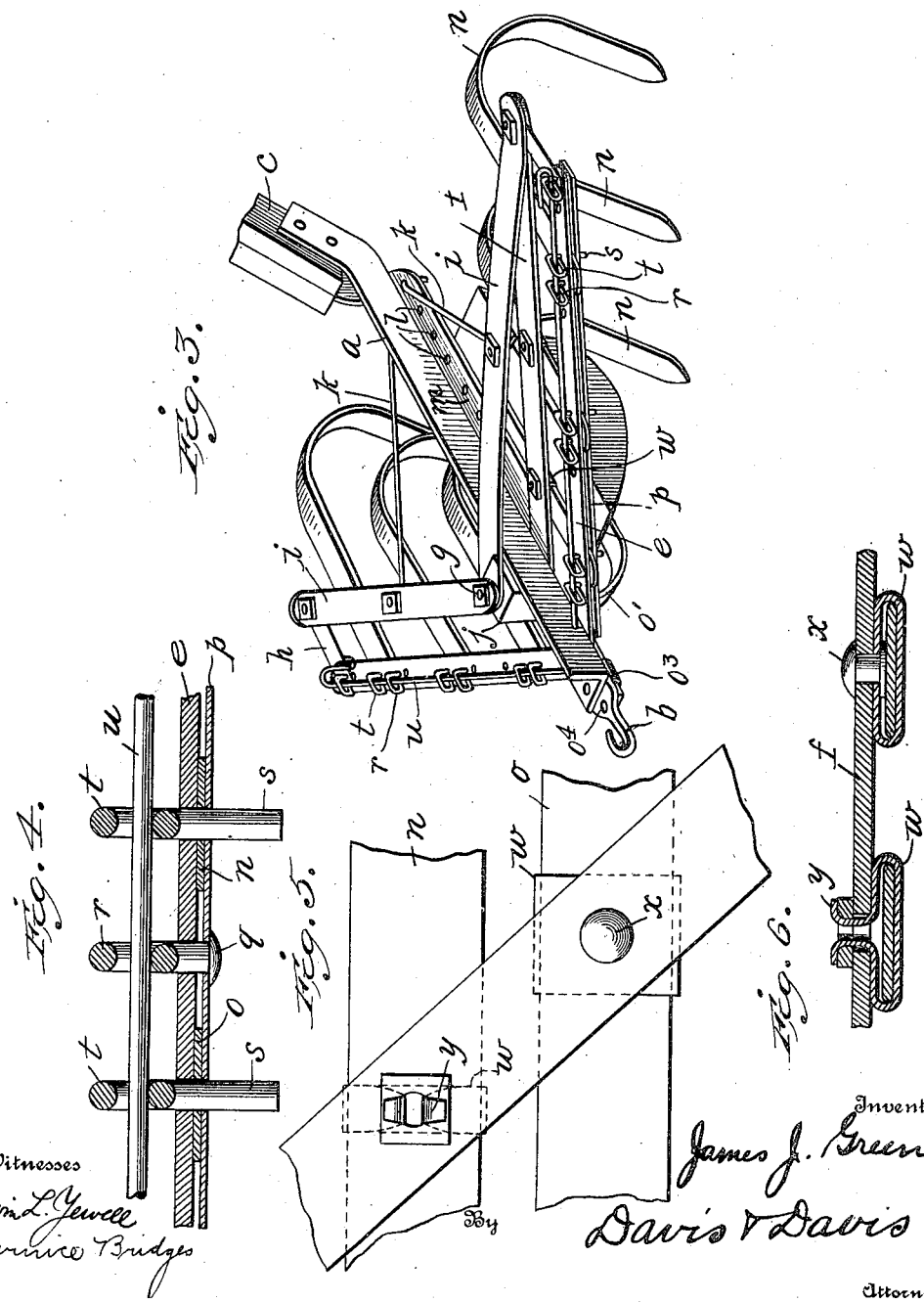

JAMES J. GREEN, OF BREMEN, GEORGIA.

COTTON-CULTIVATOR.

933,977.  Specification of Letters Patent.  Patented Sept. 14, 1909.

Application filed May 24, 1909. Serial No. 498,000.

*To all whom it may concern:*

Be it known that I, JAMES J. GREEN, a citizen of the United States of America, and a resident of Bremen, county of Haralson, State of Georgia, having invented certain new and useful Improvements in Cotton-Cultivators, of which the following is a full and clear specification, reference being had to the accompanying drawings, in which—

Figure 1 is a plan view showing my cultivator arranged for cross cultivation. Fig. 2 is a vertical section on the line 2—2 of Fig. 1. Fig. 3 a perspective view showing the cultivator adapted for row cultivation, the intermediate fenders being removed. Figs. 4, 5 and 6 detail views hereinafter described.

The object of this invention is to provide a simple and strong apparatus for cultivating cotton adapted to be converted from a row cultivator to a cross-row cultivator as more fully hereinafter set forth.

The letter $a$ designates the central beam, $b$ a draft hook attached to the forward end thereof and $c$ the handles attached to the rear end thereof. Pivoted by a bolt $d$ to the forward end of the beam, on the under side thereof, is a pair of bars $e$ which extend outwardly and rearwardly from the beam and are adapted to be adjusted forwardly and backwardly by means of a pair of bars $f$ arranged in the rear of and parallel therewith, these bars being pivoted at their forward ends to the beam by a vertical bolt $g$ and being pivotally connected at their outer ends by links $h$ to the bars $e$. Each of the bars $f$ is braced by a bar $i$ bolted rigidly to the outer end of said bar $f$ and pivotally attached to the beam at its inner end by means of the aforesaid bolt $g$, a spacing block $j$ being mounted on the beam and through which the bolt $g$ passes, to give to the bars $i$ a bracing function. To hold the swinging frames thus constructed in their adjusted positions I employ two rods $k$ whose forward ends are pivotally attached to the upper bars $i$ and whose rear ends are turned downwardly to form pins which are adapted to be engaged in any one of a series of holes $l$ in the beam, the beam being provided at one side with an extension piece or flange $m$ for the reception of the left hand series of holes. By means of these devices the frames may be swung forwardly and backwardly to widen or narrow the implement, without affecting the parallelism of the frame bars $e$ and $f$. The shanks of the cultivating teeth $n$ and the fender carrying spring arms $o$ are attached to these bars. The extreme forward ends of these shanks are pivotally confined to the under side of the bar $e$ by a bar $p$ which is clamped to said bar $e$ by rivets $g$ whose heads are formed into eyes $r$ which stand above the upper surface of the bar $e$. Pivots $s$ of the shanks extend down through the bar $e$ and the bar $p$ and the interposed shank and are readily removable vertically and whose upper ends are formed into eyes $t$ which are in alinement with and alternate with the eyes $r$. To confine the pivots $s$ in place a removable lock rod $u$ is run horizontally through the permanent eyes $r$ and the pivot eyes $t$. By these means all the shanks are pivotally connected by the bar $e$ in such manner that they may be independently detached therefrom, and in order to provide for adjusting the fenders forwardly and backwardly with respect to the cultivator teeth, the shanks of the fenders are each provided with a series of holes through any one of which the pivot $s$ may be passed.

The shanks of the fenders and the teeth are confined to the under faces of the rear bars $f$ by means of loops $w$ pivotally depending from the bars $f$, the pivot being an ordinary rivet as shown at the right hand end of Fig. 6 or an integral extension $y$ of the loop, as shown at the left hand end of Fig. 6. The loops $w$ are thus adapted to rotate on their pivots so that the shanks are free to vary their angle with respect to the bar $f$ as the frame is adjusted forwardly or backwardly, so that at whatever angle the frames be adjusted the shanks of the teeth and the fenders will remain parallel to each other. A central fender $o'$ is attached to the beam at the forward end thereof by means of suitable clips $o^2$ and $o^3$ and a vertical bolt $o^4$, but this central fender has no pivotal action.

It will be observed that for row cultivation all the side or supplemental fenders are removed leaving only the central fender while for cross-row cultivation these side fenders are put into place intermediate the teeth.

You will also observe that a feature of importance lies in the special means whereby the shanks of the cultivating teeth and the fenders may be readily attached and detached and interchanged. To detach the shanks it is simply necessary to withdraw the rod $u$ from the alined eyes $r$ and $t$, then withdraw upwardly the pivots $s$, whereupon the shanks may be drawn rearwardly out of the swiveled closed loops $w$. This provision for readily removing and reinserting the shanks of the cultivating implements is especially desirable in a cultivator of this type, as is obvious.

Having thus fully described my invention, what I claim as new, and desire to secure by Letters Patent, is:

A cultivating implement comprising a central beam, a frame projecting from each side thereof and consisting of parallel bars pivotally attached to the beam, means for adjusting each of these frames forwardly and backwardly, a series of upstanding permanent eye-bolts carried by the front bar of each frame, a series of vertical pivots carried by each front bar and alternating with said eye-bolts, and having eyes in alinement with the eyes of said eye-bolts, a removable rod running through each series of eyes, a series of closed loops swiveled to each of the rear bars of said frames, and soil working devices having their shanks passed through said loops and detachably and pivotally connected to the front bars by the aforesaid pivots.

In testimony whereof I hereunto affix my signature in the presence of two witnesses this 21 day of May 1909.

JAMES J. GREEN.

Witnesses:
M. BULLARD,
S. O. SMITH.